(12) United States Patent
Furze

(10) Patent No.: US 9,828,041 B2
(45) Date of Patent: Nov. 28, 2017

(54) TRAILER FABRICATION

(71) Applicant: Mining Vision Pty Limited, Bonville, NSW (AU)

(72) Inventor: Gordon Robert Morgan Furze, Bonville (AU)

(73) Assignee: Mining Vision Pty Limited, Bonville (AU)

( * ) Notice: Subject to any disclaimer, the term of this patent is extended or adjusted under 35 U.S.C. 154(b) by 2 days.

(21) Appl. No.: 14/991,123

(22) Filed: Jan. 8, 2016

(65) Prior Publication Data

US 2017/0197670 A1    Jul. 13, 2017

(51) Int. Cl.
*B62D 29/04* (2006.01)
*B29C 65/02* (2006.01)
*C08F 10/02* (2006.01)
*B29K 23/00* (2006.01)

(52) U.S. Cl.
CPC ............ *B62D 29/046* (2013.01); *B29C 65/02* (2013.01); *C08F 10/02* (2013.01); *B29K 2023/065* (2013.01); *C08F 2500/07* (2013.01)

(58) Field of Classification Search
CPC ....... B62D 29/046; B29C 65/02; C08F 10/02; C08F 2500/07; B60R 9/065; B60D 1/143; B29K 2023/065
USPC ............. 296/183.1, 181.3; 224/519; 280/789
See application file for complete search history.

(56) References Cited

U.S. PATENT DOCUMENTS

| | | | |
|---|---|---|---|
| 7,032,956 B2 * | 4/2006 | Gehman | B60R 9/065 224/519 |
| 8,177,258 B2 * | 5/2012 | Williams | B60D 1/143 280/789 |
| 2004/0201247 A1 | 10/2004 | Gehman et al. | |

* cited by examiner

*Primary Examiner* — Joseph D Pape
*Assistant Examiner* — Dana Ivey
(74) *Attorney, Agent, or Firm* — Venable LLP; Steven J. Schwarz

(57) ABSTRACT

A trailer (50, 60) has a chassis (1) which is fabricated from sheet plastics material. The chassis (1) is hollow and substantially planar and has an upper sheet (6) and lower sheet (10) separated by a peripheral wall (12). The shape of the chassis is generally dart like being formed by a forward triangle 3 and a rear rectangle (4). The sheet plastics material is preferably high density polyethylene which is 16 mm thick.

14 Claims, 6 Drawing Sheets

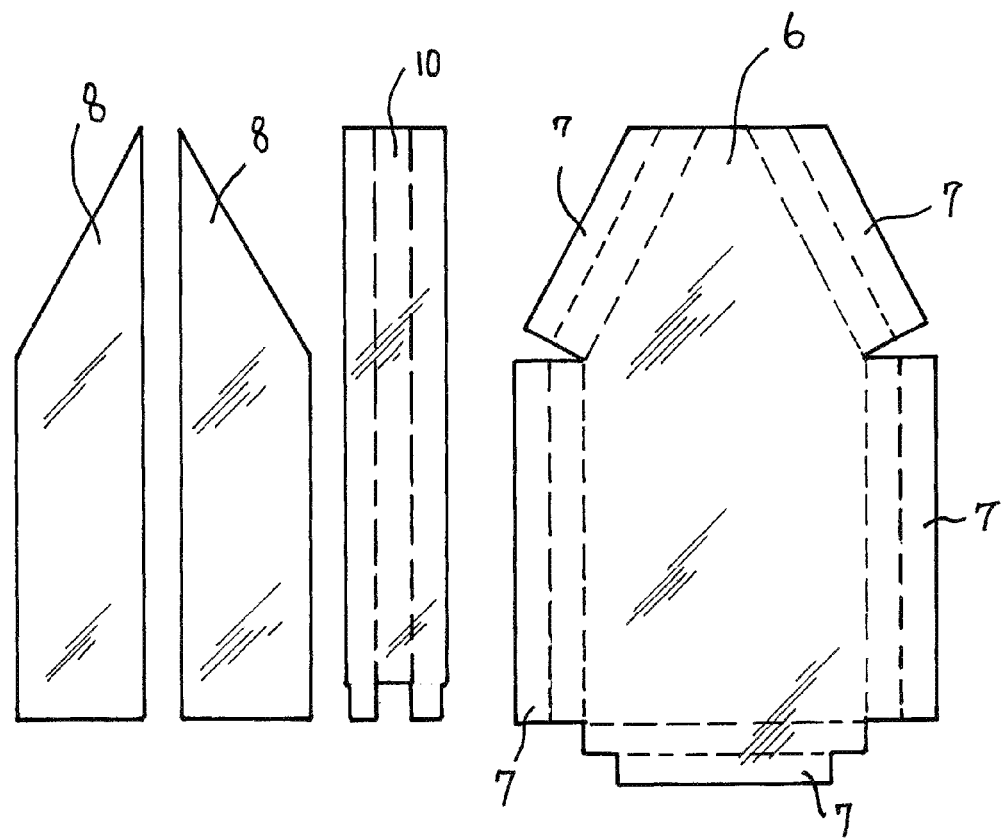
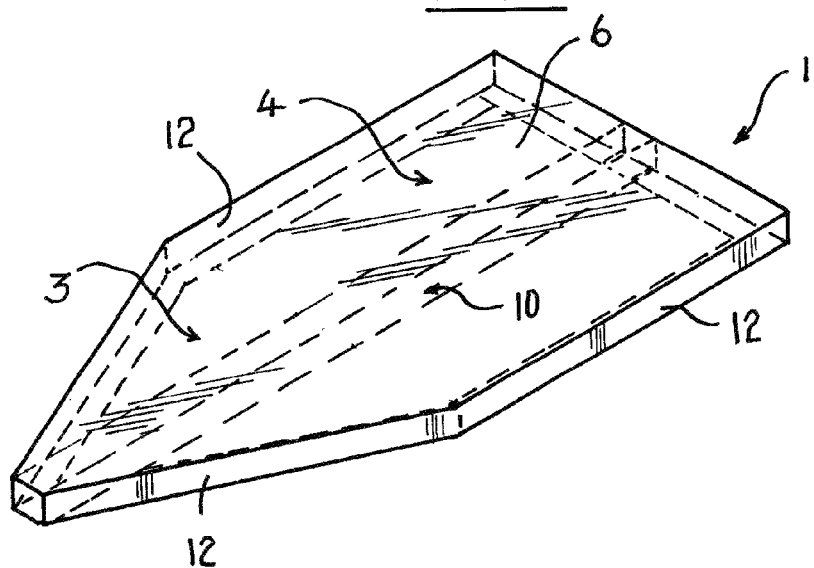
FIG.1
FIG.2

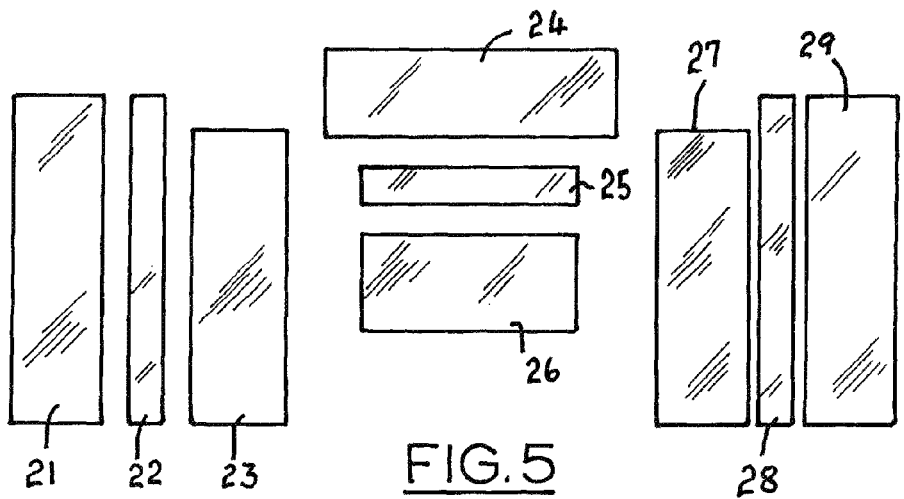
FIG.5
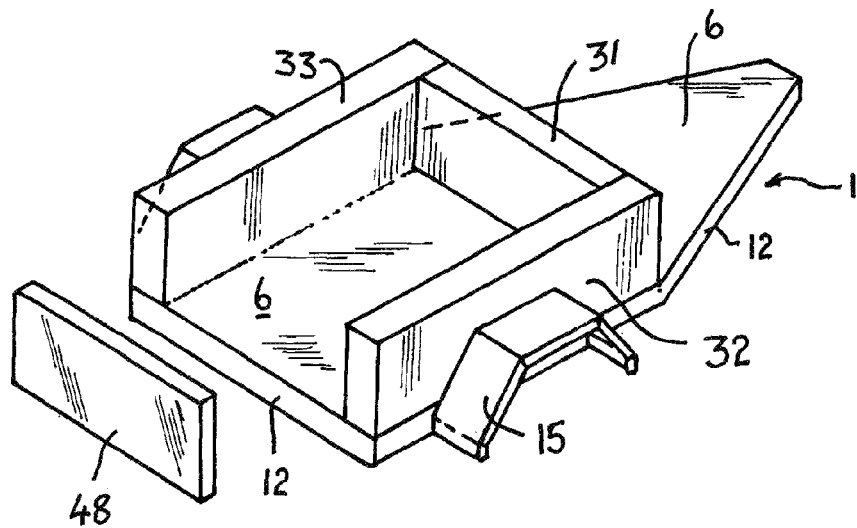
FIG.6
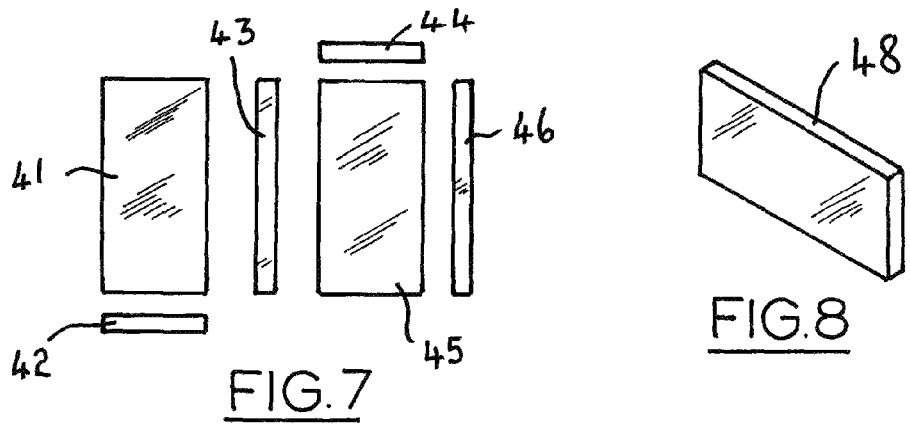
FIG.7
FIG.8

TRAILER FABRICATION

FIELD OF THE INVENTION

The present invention relates to trailers and, in particular, to trailers which are used in mining environments.

BACKGROUND ART

Trailers are widely used in many activities and are able to be towed behind vehicles and carry additional loads. Generally such trailers have 2 wheels, however, trailers with 4 or even more wheels, are also known.

Hitherto such trailers have been fabricated from sheet metal and where corrosion resistance is required, the sheet metal has normally been either painted or hot dipped galvanised, the latter being a particularly expensive and environmentally unfriendly activity.

In mining such trailers are used to provide movable antennae and other communications equipment to ensure a reliable local radio network throughout the mine site, particularly where blasting is being undertaken. Under these circumstances it is necessary to move the antenna and communications equipment and mounting these on a trailer ensures that the equipment can be easily and quickly move from one place to another within the mine site.

However, a particular problem with mining is that the mine sites are often particularly corrosive atmospheres which can be due to a combination of factors including high rainfall, sulphurous gases, abrasive dust, and the like. It has therefore been found that even hot dipped galvanised metal trailers will quickly corrode.

In recent years, it has been known to manufacture trailers with a metal chassis and a body fabricated from plastics material. The disclosures of U.S. Pat. No. 7,032,956 and US Patent Application US 2004/0201247 are representative of this art. In particular, whilst the body which retains the cargo in position is fabricated from the plastics material, the load-bearing chassis has continued to be manufactured from steel because of its strength. However, whilst strength is an advantage of steel, its susceptibility to corrosion is a significant disadvantage.

GENESIS OF THE INVENTION

The genesis of the present invention is a desire to overcome the above-mentioned disadvantages of a steel chassis by the fabrication of a trailer having both its chassis, and the body supported above the chassis, manufactured from plastics material.

SUMMARY OF THE INVENTION

In accordance with a first aspect of the present invention there is disclosed a trailer having a chassis and a body supported above the chassis, said chassis having an upper surface and a lower surface of substantially similar shape separated by a chassis peripheral wall which forms a hollow substantially planar chassis, said shape comprising a forward triangle and a rearward rectangle with said chassis peripheral wall extending around two leading edges of said triangle and three edges of said rectangle, and wherein said chassis is fabricated from sheet plastics material In accordance with a second aspect of the present invention there is disclosed a method of fabricating a trailer having a chassis and a body supported above the chassis, said chassis having an upper surface and a lower surface of substantially similar shape separated by a chassis peripheral wall, said shape comprising a forward triangle and a rearward rectangle with said chassis peripheral wall extending around two leading edges of said triangle and two side edges and a rear edges of said rectangle, said method comprising the steps of:
forming from sheet plastics material each of said chassis upper surface, said chassis lower surface, and said chassis peripheral wall, and
interconnecting said upper surface, lower surface and wall to form a hollow substantially planar chassis.

BRIEF DESCRIPTION OF THE DRAWINGS

Preferred embodiments of the invention will now be described, by way of example only, with reference to the accompanying drawings in which:

FIG. 1 is a plan view of planar pieces from which the chassis of the trailer of a first embodiment is to be fabricated, FIG. 2 is a perspective view from above and the front of the fabricated chassis trailer, FIG. 5 is a plan view of the planar pieces from which the front wall and side walls of a body are to be fabricated, FIG. 6 is a perspective view from above and the rear of the trailer chassis of FIG. 4 to which are attached the front wall and side walls of FIG. 5 to complete the body, FIG. 7 is a plan view of the planar pieces from which a tailgate is to be fabricated, FIG. 8 is a perspective view of the tailgate.

DETAILED DESCRIPTION

Figure 3:
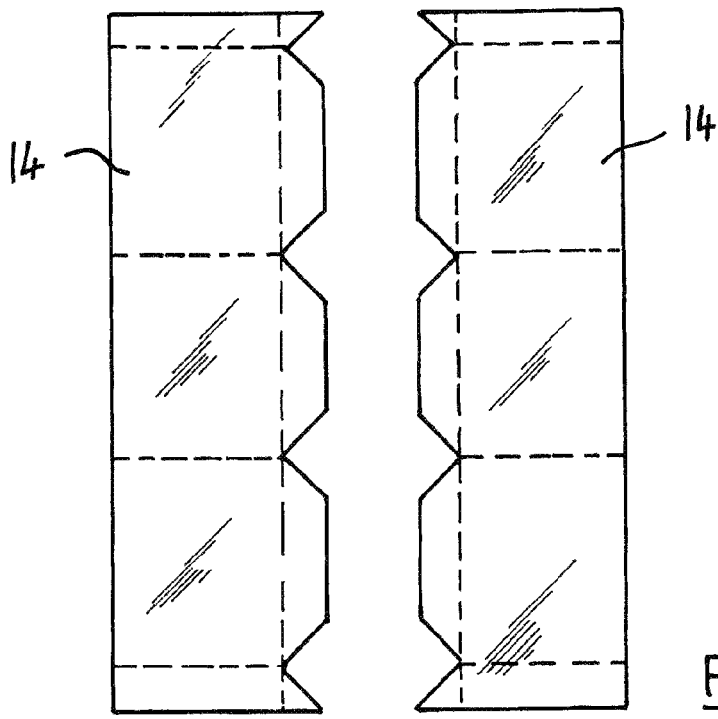
FIG. 3 is a plan view of the planar pieces from which the mudguards are to be fabricated.

As seen in FIGS. 1 and 2, the chassis 1 of the preferred embodiment has a generally dart like form being comprised of a forward triangle 3 and a rear rectangle 4. The component parts of the chassis 1 prior to its fabrication are illustrated in FIG. 1 and take the form of an upper sheet 6 with five contiguous wall portions 7. The chassis 1 is also formed from two lower sheets 8 and a generally rectangular longitudinal frame 10. The upper sheets 6, lower sheets 8 and longitudinal frame 10 are all formed from high density polyethylene sheet material which is preferably approximately 16 mm thick. The sheets are 2000 mm wide by 4000 mm long.

Figure 4:
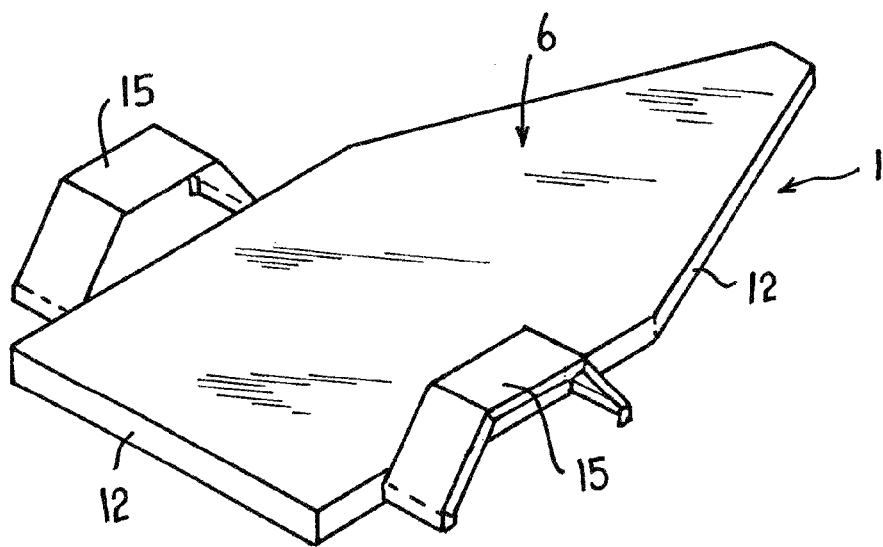
FIG. 4 is a perspective view from above and the rear of the chassis of FIG. 2 including the mudguards of FIG. 3.

The longitudinal frame 10 and wall portions 7 are folded along the dotted lines illustrated in FIG. 1 and welded so as to form the completed chassis 1 illustrated in FIG. 2 with the wall portions 7 being welded together so as to form a peripheral wall 12. The chassis 1 is 2200 mm long, 1000 mm wide and the distance between the upper and lower surfaces of the chassis 1 is 90 mm Turning now to FIG. 3, two shaped strips 14 are cut into the profile illustrated in FIG. 3, folded along the dotted lines indicated in FIG. 3, and welded together so as to form the two mud guards 15 illustrated in FIG. 4. The mud guards 15 are welded to the peripheral wall 12 in the positions indicated in FIG. 4.

Turning now to FIGS. 5 and 6, in FIG. 5 nine rectangular sheets 21-29 are cut from the sheet plastic material and welded together so as to form a front wall 31 and two side walls 32, 33 which are then welded to the upper sheet 6 of the chassis 1.

Figure 10:
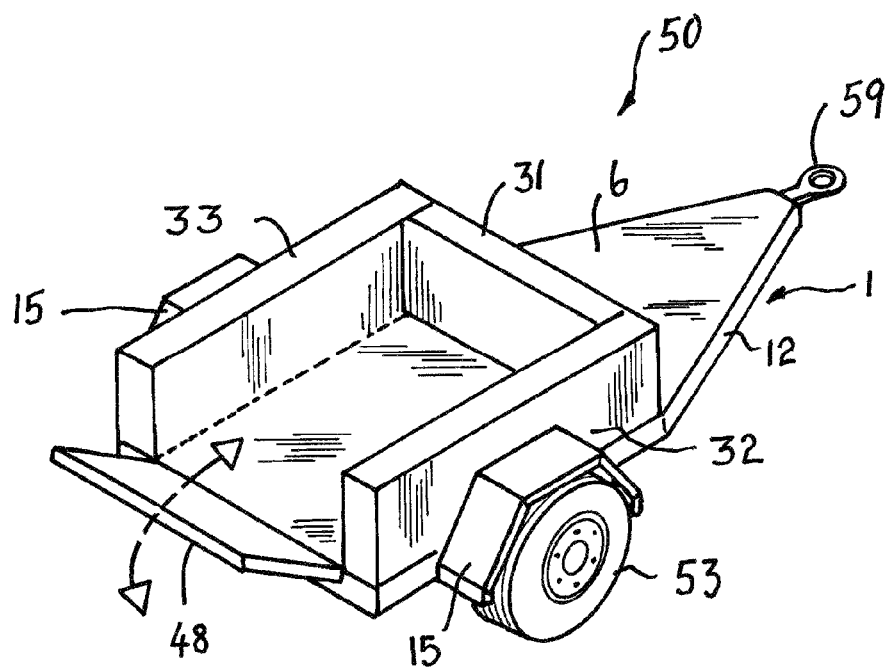
FIG. 10 is a perspective view of the completed trailer including chassis and body.

Similarly, as seen in FIG. 7, six rectangular sheets 41-46 are cut and welded together so as to form a tail gate 48 illustrated in FIG. 8. The tailgate 48 is pivotally attached to the side walls 32, 33 as indicated in FIG. 10. The space between the front wall 31, side walls 32, 33 and the tailgate 48 constitutes a cargo bay.

Figure 9:
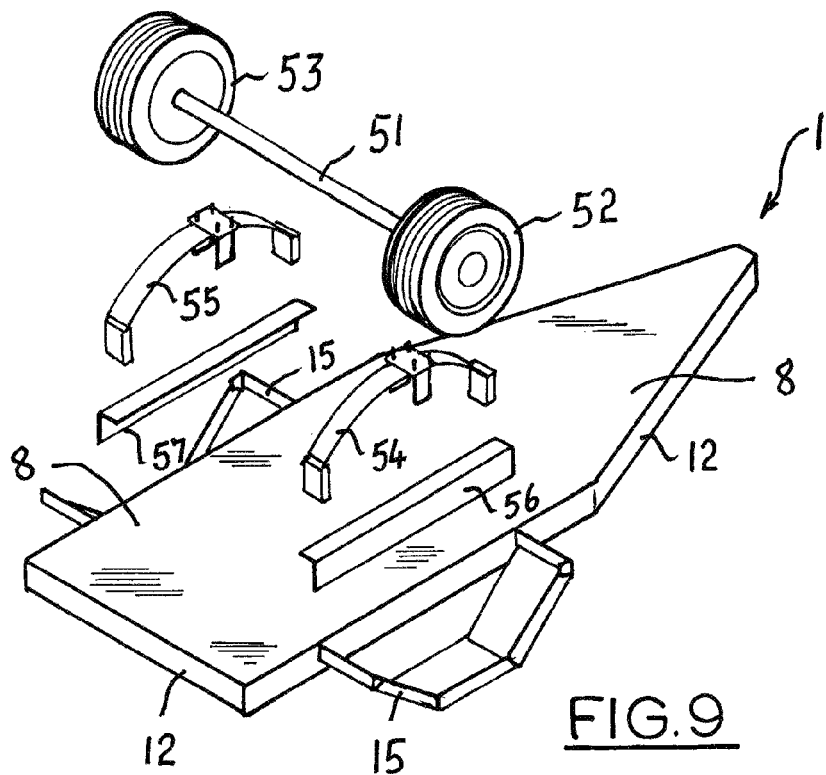
FIG. 9 is and exploded inverted view of the chassis showing the wheels, springs and axle arrangement.

All the component parts hitherto are fabricated from the sheet plastics material, however, as seen in FIGS. 9 and 10, the trailer 50 of the first embodiment has a conventional metal axle 51, a pair of conventional metal and rubber wheels 52, 53 and a pair of conventional metal leaf springs 54, 55. A pair of steel angle irons 56, 57 is secured to the underside of the chassis 1, for example by bolting through the chassis 1, and the leaf springs 54, 55 are connected to the angle irons 56, 57. In this way the load applied to the chassis 1 by the leaf springs can be distributed to the chassis 1. A hitch 59 is secured to the apex of the forward triangle 3 of the chassis 1 to complete the trailer 50, which is a general purpose trailer.

Turning now to FIGS. 11-14, a second embodiment of a trailer 60 is illustrated, the trailer 60 being a specialised trailer intended for use in mine sites and similar locations. The trailer 60 has the same chassis 1 and mud guards 15 as the trailer 50.

Figure 11:
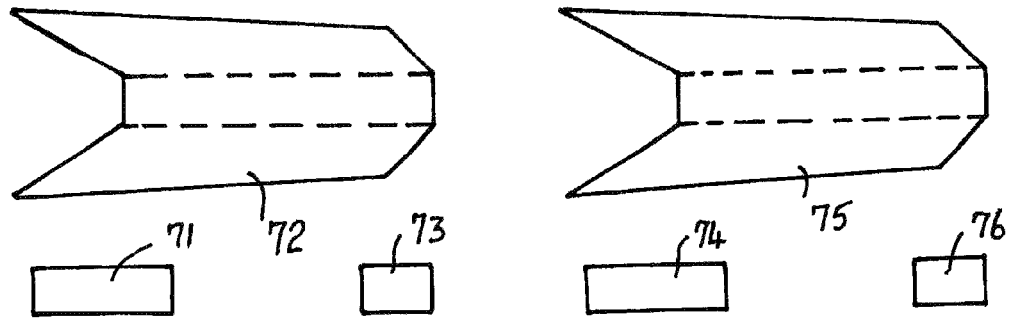
FIG. 11 is a view of the planar pieces from which the body of a trailer of a second embodiment is to be fabricated.
Figure 12:
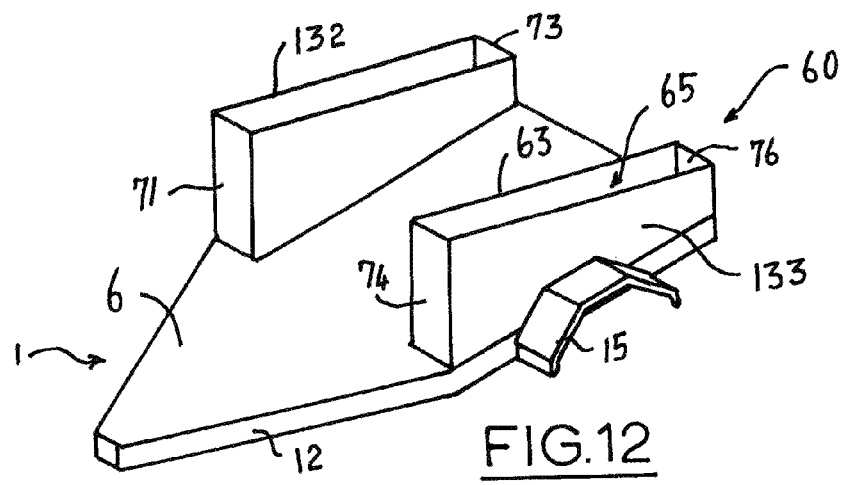
FIG. 12 is a perspective view of the chassis and body of the trailer of the second embodiment.
Figure 13:
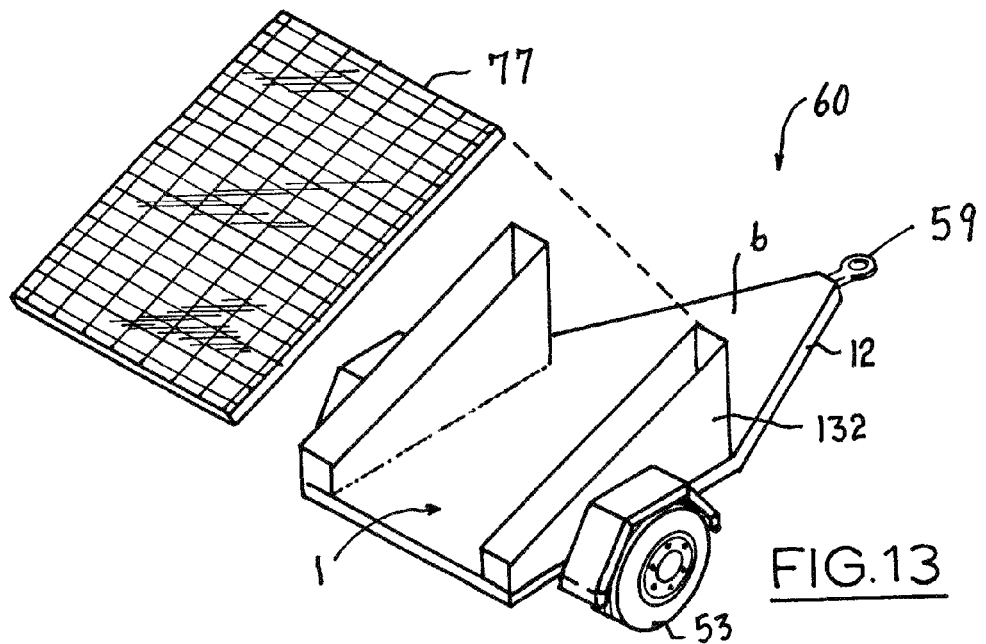
FIG. 13 is an exploded perspective view of the trailer of the second embodiment illustrating the solar cell to be mounted on the body.

As seen in FIG. 12, the trailer 60 has no front wall 31 and its side walls 132, 133 are modified so as to firstly have sloping upper edges 63 and secondly to have an accessible interior 65. Thus these side walls 132, 133 form boxes which are preferably used for storing rechargeable batteries (not illustrated). The side walls 132, 133 are formed from six sheet panels 71-76 as illustrated in FIG. 11. These are folded along the dotted lines as indicated and welded so as to form the side walls 132, 133 illustrated in FIG. 12. As illustrated in FIG. 13, an array of solar cells 77 is supported by the side walls 132, 133 at an angle which preferably corresponds to the latitude of the mine site where the trailer 60 is to be utilised.

Figure 14:
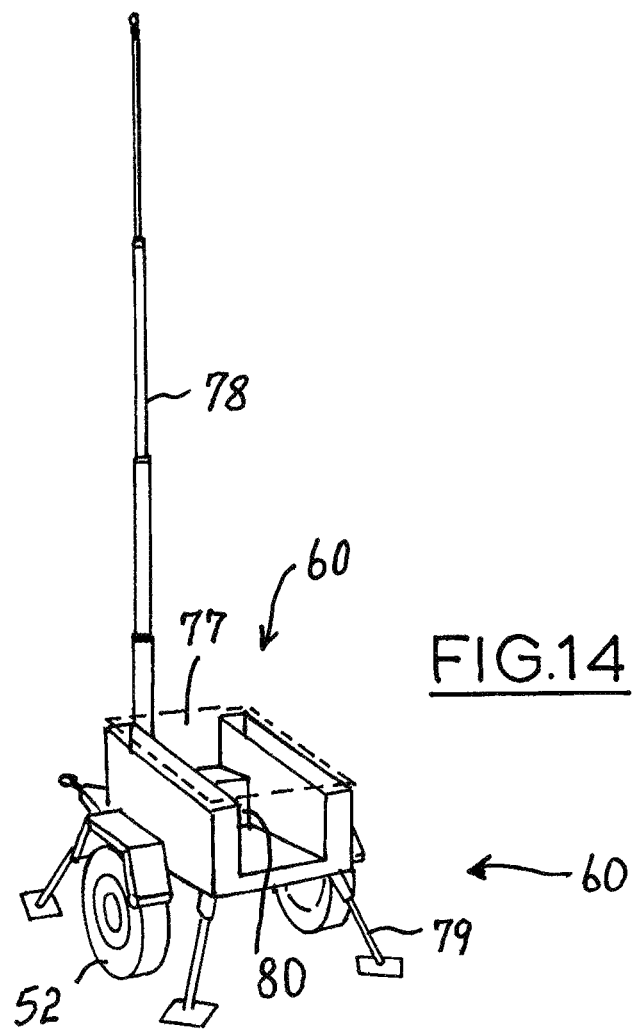
FIG. 14 is a perspective view from the rear of the completed trailer of the second embodiment in operation at a mine site.

As illustrated in FIG. 14, the completed trailer 60 is preferably provided with a telescopic radio mast 78, four stabilising legs 79 and ancillary radio equipment 80.

It will be appreciated by those skilled in the mining arts that the trailer 60 can be quickly deployed at any position in a mine site so as to form part of the radio network within the mine site. If required, the trailer 60 can be quickly moved to a safe position adjacent to the area where blasting is currently taking place.

The metal components of the trailer 60, such as the hitch 59, axle 51, wheels 52, 53, leaf springs 54, 55 and angle irons 56, 57 are regarded as replaceable expendable components for which spare parts are readily available. Accordingly, when quickly corroded, these components can be replaced without detracting from the durability and utility of the trailer 60 which, as a whole, is essentially un-corrodible.

The foregoing describes only two embodiments of the present invention and modifications, obvious to those skilled in the trailer fabrication arts, can be made thereto without departing from the scope of the present invention.

For example, the ancillary radio equipment 80 of the trailer 60 can be contained within a box positioned in the same position as the front wall 31 of the trailer 50, but fabricated in the same way as the side walls 132, 133. The size of the box can be changed to suit the volume of the ancillary radio equipment 80. The box is preferably provided with a lid.

The term "comprising" (and its grammatical variations) as used herein is used in the inclusive sense of "including" or "having" and not in the exclusive sense of "consisting only of".

The invention claimed is:

1. A trailer having a chassis and a body supported above the chassis, said chassis having an upper surface and a lower surface of substantially similar shape separated by a chassis peripheral wall which forms a hollow substantially planar chassis, said shape comprising a forward triangle and a rearward rectangle with said chassis peripheral wall extending around two leading edges of said triangle and three edges of said rectangle, said body having two substantially parallel side walls, wherein said chassis upper and lower surfaces are substantially parallel, and each said side wall has a top edge which is inclined to said chassis upper surface, and wherein said chassis is fabricated from sheet plastics material.

2. The trailer as claimed in claim 1 wherein said three edges of said rectangle comprise two sides edges and a rear edge of said rectangle, each said side wall is fabricated from sheet plastics material and formed into a box, an exterior side wall of each said box being substantially co-planar with the corresponding side edge of said peripheral wall, and a base of each said box being substantially co-planar with said chassis upper surface.

3. The trailer as claimed in claim 2 having a space between said side walls comprising a cargo bay.

4. The trailer as claimed in claim 3 wherein said chassis upper and lower surfaces are substantially horizontal in use.

5. The trailer as claimed in claim 1 wherein said inclined top edges support a solar cell.

6. The trailer as claimed in claim 5 wherein the trailer is to be used at a location having a latitude and each of said inclined top edges is inclined to said chassis upper surface at an angle approximately equal to said latitude.

7. The trailer as claimed in claim 1 wherein a trailer hitch is located at an apex of said two leading edges of said triangle.

8. The trailer as claimed in claim 1 wherein said plastics material comprises high density polyethylene.

9. A method of fabricating a trailer having a chassis and a body supported above the chassis, said chassis having an upper surface and a lower surface of substantially similar shape separated by a chassis peripheral wall, said shape comprising a forward triangle and a rearward rectangle with said chassis peripheral wall extending around two leading edges of said triangle and two side edges and a rear edge of said rectangle, and said body having two substantially parallel side walls, said method comprising the steps of:

forming from sheet plastics material each of said chassis lower surface, and said chassis upper surface and said chassis peripheral wall, whereby said chassis upper and lower surfaces are formed to be substantially parallel, and interconnecting said upper surface, lower surface and peripheral wall to form a hollow substantially planar chassis, and forming each of said side walls to have a top edge which is inclined to the chassis upper surface.

10. The method as claimed in claim 9 wherein said interconnecting is carried out by plastics welding.

11. The method as claimed in claim 10 wherein said side walls are each formed from sheet plastics material and whereby a space formed between said sides comprises a cargo bay.

12. The method as claimed in claim 9 including the further step of:

supporting a solar cell on said inclined top edges.

13. The method as claimed in claim 12 wherein the trailer is to be used at a location having a latitude and each of said inclined top edges is formed to be inclined to said chassis upper surface at an angle approximately equal to said latitude.

14. The method as claimed in claim 9 wherein said plastics material is high density polyethylene.

\* \* \* \* \*